United States Patent [19]

Gessell et al.

[11] Patent Number: 5,028,574

[45] Date of Patent: Jul. 2, 1991

[54] COMPOSITION AND METHOD FOR FRICTION LOSS REDUCTION

[75] Inventors: Donald E. Gessell, Friendswood, Tex.; Donald P. Hosman, Ponca City, Okla.

[73] Assignee: Conoco Inc., Ponca City, Okla.

[21] Appl. No.: 494,252

[22] Filed: Mar. 14, 1990

Related U.S. Application Data

[62] Division of Ser. No. 271,552, Nov. 14, 1988, Pat. No. 4,945,142.

[51] Int. Cl.$^5$ .......................... C08F 4/649; C08F 4/68
[52] U.S. Cl. ..................... 502/104; 502/121; 502/122; 502/123; 502/125; 502/126; 502/127; 526/128
[58] Field of Search ............... 502/122, 121, 123, 125, 502/126, 127, 104

[56] References Cited

U.S. PATENT DOCUMENTS

| | | | |
|---|---|---|---|
| T. 965,004 | 12/1977 | Caunt | 502/122 |
| 3,408,340 | 10/1968 | Tanaka et al. | 526/128 |
| 4,098,907 | 7/1978 | Tokunaga et al. | 526/116 |
| 4,222,893 | 9/1980 | Karayannis et al. | 502/107 |
| 4,229,318 | 10/1980 | Mueller-Tamm et al. | 502/105 |
| 4,358,572 | 11/1982 | Mack et al. | 585/525 |
| 4,420,593 | 12/1983 | Sato et al. | 526/128 |
| 4,442,224 | 4/1984 | Takitani et al. | 502/112 |
| 4,450,242 | 5/1984 | Mink | 502/105 |
| 4,478,952 | 10/1984 | Mack et al. | 502/110 |
| 4,493,904 | 1/1985 | Mack | 502/122 |
| 4,675,368 | 6/1987 | Bienfait et al. | 526/75 |

*Primary Examiner*—Patrick P. Garvin
*Attorney, Agent, or Firm*—C. R. Schupbach

[57] ABSTRACT

A catalyst and method is provided for the production of ultra-high molecular weight polymers characterized as having an inherent viscosity of above 12.0 by contacting ethylenically unsaturated monomers with a dual electron donor catalyst under polymerization conditions.

10 Claims, No Drawings

COMPOSITION AND METHOD FOR FRICTION LOSS REDUCTION

This is a division of application Ser. No. 271,552 filed Nov. 14, 1988 and now U.S. Pat. No. 4,945,142.

SUMMARY OF THE INVENTION

Polymerization catalysts are prepared according to a set procedure to increase inherent viscosity in polymers produced using such catalysts. In addition, the polymers are preferably produced in S a solution polymerization system for direct injection into a hydrocarbon flowing through a conduit.

This invention relates to a catalyst and method for the production of ultra-high molecular weight polymers. Such materials are suitable for use as drag reducing agents in hydrocarbons flowing through conduits. More particularly, the present invention provides a catalyst and method for the production of ultra-high molecular weight polymers characterized as having an inherent viscosity higher than 12.0 which provide extremely effective drag reduction.

It has long been known that alpha-olefins may be polymerized in the presence of a catalyst system generally referred to as Ziegler-Natta catalysts. These catalysts generally consist of materials such as a titanium trihalide and organometallic co-catalysts such as aluminum alkyls or aluminum halides as represented by triethylaluminum and diethylaluminum halide.

There has been an extremely large amount of work carried out modifying Ziegler-Natta polymerizations with the aim of developing more efficient promoters for the production of polymers, especially highly crystalline polypropylene and poly(butene-1).

The present invention is directed toward production of highly non-crystalline, hydrocarbon-soluble, very high (or ultra-high) molecular weight polymers primarily suitable as materials for reducing the frictional drag of hydrocarbon fluids flowing through conduits. Such polymers are not useable for production of films, blow-molded or shaped artifacts.

With the increasing emphasis on production of hydrocarbons in various remote locations of the world as more easily recoverable reservoirs are depleted, it has become necessary to develop transportation systems from such remote producing sources. Such transportation systems have traditionally been pipelines. Pipelines require pumping stations spaced periodically along the pipeline to move hydrocarbon fluids rapidly and efficiently to their destination. However, such fluids vary greatly in viscosity and often are heavily temperature dependent before economical transportation by pipeline can be achieved.

One solution to the necessity for adding additional pump stations is constructing over-sized pipelines. Such over-sized pipelines require additional construction costs. Since petroleum-producing fields will be depleted at a future time, it is more economical to add a drag reducing material to the hydrocarbon fluid in order to reduce the frictional loss of the hydrocarbon flowing through the pipeline, rather than add to the cost of the pipeline by adding additional pump stations or increase the pipeline size.

U.S. Pat. No. 3,692,675 teaches a method for reducing friction loss or drag for pumpable fluids through pipelines by adding a minor amount of a very high molecular weight polymers. Amounts of from about 5 to about 500 parts per million of polyalpha-olefins in the pumpable fluid have been shown to provide drag reduction. The percent drag reduction for hydrocarbons being transported through a pipeline was defined in this patent as Percent Drag Reduction =

$$\frac{\text{Pressure Drop of Oil} - \text{Pressure Drop of Polymer Solution}}{\text{Pressure Drop of Oil}} \times 100$$

Polymers prepared from $C_8$ to $C_{10}$ alphamonoolefins were found to be the most effective studied. It was further demonstrated that higher molecular weight polymers, as measured by the accepted criteria of the polymers inherent viscosity, were more effective than polymers possessing low inherent viscosities and lower molecular weights.

Early attempts at utilizing polymers for such purposes involve polymers having relatively low inherent viscosities and molecular weights. The molecular weights were variously described as being between 1 and 10 million and were not measured directly, but rather indirectly, via the inherent viscosity method.

It was also discovered as disclosed in U.S. Pat. Nos. 4,415,714 and 4,493,904 that addition of an electron donor material to the basic transition metal halide and aluminum alkyl co-catalysts of a Ziegler-Natta system, provided enhanced activity, which in turn allowed polymerizations to be carried out at lower temperatures. This polymerization at lower temperature was found to increase the inherent viscosity (molecular weight) and provide a more effective drag reducing material. The inherent viscosities of the materials prepared by these methods ranged to nearly 10.0, indicating a very high molecular weight product.

An improvement was set forth in U.S. Pat. No. 4,358,572, wherein it was discovered that a pre-reaction of a transition metal halide together with an ether prior to completing the catalyst preparation allowed the preparation of a polymer having inherent viscosities of up to 11.5 when polymerization was ceased at a polymer content of 20 percent by weight or less.

However, it would be beneficial to provide a method and a polymer of extremely high molecular weight which can be prepared under economical conditions, in order to even further enhance the reduction of drag in hydrocarbon fluids flowing through pipelines.

We have now discovered catalysts capable of forming ultra-high molecular weight polymers characterized by an inherent viscosity above 12.0, and which produce from ethylenically unsaturated monomers a hydrocarbon soluble, non-crystalline polymer capable of reducing drag in hydrocarbons flowing through conduits. In a preferred embodiment, teachings of the prior art could be utilized in conjunction with the present invention to even further improve the efficiency and the inherent viscosity of the materials produced.

THE PRIOR ART

The body of prior art relating to Ziegler-Natta catalysis is extremely large. However, representative, but non-exhaustive examples of patents showing catalyst systems include U.S. Pat. No. 3,408,340 in which dialkylpolysiloxanes or the like used in certain proportions in an inert solvent in order to increase catalyst reaction rate.

U.S. Pat. No. 4,358,572 shows a method of increasing inherent viscosity in drag reducing materials by utilizing ether-activating agent with a transition metal halide prior to combination with the Ziegler-Natta co-catalyst.

U.S. Pat. No. 4,420,593 utilizes electron donors and acceptors at any time during the reaction mixtures of ether and polysiloxanes are specifically shown. Polymers produced are stereo regular polymers from a slurry polymerization system. Polymers produced were likewise crystalline.

THE PRESENT INVENTION

The present invention utilizes a novel catalyst system which is prepared in a specified manner to provide a polymer having an inherent viscosity of at least 12.0. The system allows for increased reaction rates to obtain polymers having conventional inherent viscosities, i.e. below 12.0 at extremely fast reaction rates and nearly ambient temperatures, but allows the production of extremely high IV materials for commercially feasible reaction times at lower temperatures.

Therefore, an object of the present invention is to provide an improved catalyst and method for the polymerization of ethylenically unsaturated monomers to produce and high molecular weight polymer characterized as having an inherent viscosity greater than 12.0 by utilizing a catalyst modification which results in a higher inherent viscosity in the produced polymers. Other objects will become apparent to those skilled in the art as the description proceeds.

We have now found in accordance with the present invention that ultra-high molecular weight, non-crystalline hydrocarbon soluble polymers characterized as having an inherent viscosity above 12.0 can be produced utilizing a catalyst comprising:

(1) a transition metal halide of the general formula $MX_t$ wherein M is titanium or vanadium, and t is equal to 2.0 to 4.0, and X is a halogen;

(2) at least one first electron donor selected from the group consisting of ethers, esters, amines, phosphines, piperidines, phosphites, phosphates, pyridines, sulfides and mixtures of these;

(3) a co-catalyst comprising an organoaluminum or organoaluminum halide of the formula $AlR_nX_{3-n}$, wherein R is a hydrocarbon radical containing from 1 to 20 carbon atoms, X is at least one constituent selected from the group consisting of halogen, siloxide or alkoxide, and n is less than 3.0; and (4) a polysiloxane second electron donor having the general formula

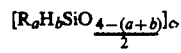

wherein R is hydrogen an alkyl group containing from 1 to 20 carbon atoms, an aralkyl or alkaryl group containing from 6 to 20 carbon atoms, a and b are greater than 0, where the sum of a+b does not exceed 3, and c is 2 or more.

We have discovered that the use of a non-silicon containing electron donor and a polysiloxane under the mixing order and conditions described have a synergistic effect as illustrated in the experimental examples set forth hereafter.

Further, the present invention comprises a method of forming an ultra-high molecular weight polymer by first pre-reacting the first electron donor with the transaction metal compound before completing the catalyst preparation. The catalysts are prepared under an inert anhydrous atmosphere. The catalysts are prepared by combining a transaction metal halide with an electron donor selected from the group consisting of ethers, esters, amines, phosphines, piperidines, phosphites, phosphates, pyridines, sulfides or mixtures of these, and allowing the components to react for at least 3, preferably 5 minutes. The co-catalyst and polysiloxane are added to complete the catalyst. More specifically, the method comprises:

(1) combining a transition metal halide of the general formula $MX_t$ wherein M is titanium or vanadium, and t is equal to 2.0 to 4.0, and X is a halogen with, (2) at least 1 first electron donor selected from the group consisting of ethers, esters, amines, phosphines, piperidines, phosphites, phosphates, pyridines, and sulfides and allowing the components to react for a period of at least 3 minutes, (3) then contacting the reaction product of (1) with (2), with a co-catalyst comprising an organoaluminum or organoaluminum halide of the formula $AlR_nX_{3-n}$, wherein R is a hydrocarbon radical containing from 1 to 20 carbon atoms, X is at least one constituent selected from the group consisting of halogen, siloxide, or alkoxide and n is less than 3.0, and (4) combining the resulting material with a polysiloxane second electron donor having the general formula

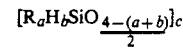

wherein R is hydrogen, an alkyl group containing from 1 to 20 carbon atoms, an aralkyl or alkaryl group containing from 6 to 20 carbon atoms, a and b are greater than 0, and where the sum of a and b does not exceed 3, and c is 2 or more.

Once prepared, the catalyst is contacted with at least one alpha-olefin containing from 2 to 20 carbon atoms, and where at least 40 mole percent of the olefins in contact with the catalyst are $C_6$ and larger in carrying out the polymerization.

The polymerization is carried out under standard polymerization conditions. Normally, such reactions are carried out at temperatures from $-25°$ C. to about $80°$ C. and ambient pressure. Pressures higher or lower than ambient can be used. It is simply more convenient to carry out the reaction at ambient pressure. Polymerizations can be carried out to extreme or complete polymerization but normally are carried out for a specified length of time, at which time total polymerization may not have occurred.

It is preferred, but not critical, that polymerization be ceased at a level below 20 percent by weight and that the temperatures utilized be as low as possible in order to maximize inherent viscosities. However, the catalysts of the present invention will provide higher inherent viscosities than known catalysts when compared under the same polymerization conditions.

Ethylenically unsaturated monomers suitable for use in the present invention include alpha-olefins containing from 2 to 20 carbon atoms. Representative but nonexhaustive examples of such olefins include ethylene, propylene, butene-1, pentene-1, 4-methylpentene, octene-1, dodecene-1, decene-1, hexene-1, and octadecene-1. These olefins can be used alone. They can also be utilized with other ethylenically unsaturated monomers such as butadiene, pentadiene, styrene, isoprene, alphamethylstyrene, and the like. However, for purposes of promoting drag reduction in hydrocarbons flowing through conduit, it is preferred that at least 20 weight percent of the resultant polymer is formed from alpha-olefins containing at least 4 carbon atoms. It is most preferred that the polymer is dissolved in the hydrocarbon.

Preferably, the polysiloxane utilized in the catalyst is a hydropolysiloxane having an a value of from 0.1 to 2, a b value of 1, 2 or 3, and wherein the sum of a and b does not exceed 3. In a most preferred embodiment, the transition metal halide and diethyl ether first modifier are allowed to react for at least 3 minutes and preferably 5 minutes, before completing the catalyst preparation. Allowing such reaction time provides an increase in inherent viscosity.

The catalyst can be prepared as a slurry, using a hydrocarbon diluent. These materials are inactive hydrocarbon solvents with respect to the polymerization. Examples of such materials are straight chain aliphatic compounds or branched hydrocarbons such as ethane, propane, butane, pentane, hexane, heptane or octane. Also suitable are alicyclic hydrocarbons such as cyclohexane, methyl cyclopentane and tetralin. In addition, aromatic hydrocarbons can be used such as benzene, toluene, and xylene. Of course, mixtures and analogues of these compounds can be used such as Molex (trademark of Universal Oil Products) raffinate which is a complex mixture of branched aliphatic, cyclic aliphatic, aromatic, and trace amounts (2-3%) of unbranched aliphatic hydrocarbons. The hydrocarbon diluent can also be an α-olefin.

It is preferred to use a hydrocarbon which is a good solvent for the polymer and which also boils at a temperature much higher than the polymerization temperature so that polymerization can be carried out at atmospheric pressure.

Of course, utilizing hydrocarbons which solubilize the produced polymers results in a solution polymerization and such polymerizations are preferred. Solution polymerizations are preferred since the resultant reactor product can be utilized as produced without the necessity of isolating the drag reducing polymer. Also, if the polymer is already in solution, it is easier to dissolve the polymer in a hydrocarbon fluid flowing through a conduit and obtain a homogenous solution. The resultant solution can be injected directly into hydrocarbon fluids flowing through conduits and the dissolution of the polymer in the hydrocarbon. Normally, such solution polymerizations will contain from 1 to 20 percent by weight polymer, but of course higher concentration can be formed. As described in the prior are, however, the higher the concentration of polymer, the lower the overall average inherent viscosity.

Catalyst modifiers are materials which activate the catalyst while allowing the catalyst to remain in the form of a finely divided slurry. In the present invention, these activating catalyst modifiers are weak to moderately strong Lewis bases, as defined in *Advanced Organic Chemistry: Reactions. Mechanisms, and Structures.* March, J, McGraw-Hill Book Company, 1968, page 227. Concisely stated, a Lewis base is a compound with an available pair of electrons either unshared or in a π orbital. These materials are catalyst poisons (or deactivators) when present in larger quantities. Conversely, this same Lewis basicity which poisons the catalyst must be present in a lesser activating amount, since the total absence of Lewis base provides no enhanced activity and simply dilutes the catalyst.

Representative but non-exhaustive examples of such modifying agents are ethers, amines, phosphines, piperidines, phosphites, phosphates, pyridines, esters and sulfides. Of these, ethers and amines are preferred activating agents, since better activity is found and the catalyst is less sensitive to deactivation.

Ether activators are selected from alkyl ethers where ether oxygen is attached directly to two aliphatic groups and may have aromatic substituents; aryl ethers wherein the ether oxygen is attached directly to two aromatic groups; aryl alkyl ethers wherein the ether oxygen is attached directly to one aliphatic and one aromatic group; and cyclic ethers wherein the ether oxygen is an integral part of a ring structure. The ether can therefore contain alkyl, aryl, aryl alkyl, or alkyl aryl groups, each containing from 2 to 30 carbon atoms. These materials can be used at modifier to titanium molar ratios of up to 10.0.

Representative but non-exhaustive examples of alkyl ethers are dimethyl ether, benzyl ether, tert-butyl methyl ether, di-n-butyl ether, diisopropyl ether, and di-n-propyl ether. Representative examples of cyclic ethers are cyclododecene oxide, cyclohexene oxide, cyclooctene oxide, cyclopentene oxide, dibenzylfuran, dihydropyran, furan, 2-methylfuran, 3-methylfuran, 2-methyltetrahydrofuran, 3-methyltetrahydrofuran, styrene oxide, and tetrahydrofuran. Representative examples of aryl ethers are m-phenoxytoluene and phenyl ether. Representative examples of aryl alkyl ethers are anisole, butyl phenyl ether, m-dimethoxybenzene, p-dimethoxybenzene, 2,6-dimethoxytoluene, 1-methoxynaphthalene, and 2-methoxynaphthalene.

Representative but non-exhaustive examples of amines useful in the present invention are tri-n-butyl amine, diisopropyl ethyl amine, dibutyl amine, trimethyl amine, tri-n-propyl amine, tri-i-propyl amine, tribenzyl amine, tri(4-methyl phenyl) amine, triphenyl amine, dimethyl phenyl amine, di-sec-butyl benzyl amine, ethyl propyl phenyl amine, diisopropyl ethyl amine, diisopropyl amine, di-n-butyl amine, dibenzyl amine, diphenyl amine, benzyl methyl amine, benzyl phenyl amine, and n-butyl-i-propyl amine. These amines can be used in amine to titanium mole ratios of up to 5.0.

Representative but non-exhaustive examples of phosphines useful in the practice of the present invention are tributyl phosphine, trioctyl phosphine, trimethyl phosphine, triphenyl phosphine, dibenzyl phenyl phosphine, diphenyl butyl phosphine, dioctyl benzyl phosphine, dihexyl methyl phosphine, di-cyclo-pentyl ethyl phosphine, hexyl methyl-i-propyl phosphine, and ethyl(2-phenyl ethyl)phenyl phosphine. These phosphines can be used in phosphine to titanium mole ratios of up to 3.0.

Representative but non-exhaustive examples of phosphates useful in the practice of the invention are tributyl phosphate, dimethyl octyl phosphate, diphenyl propyl phosphate, di-s-butyl benzyl phosphate, trioctyl phosphate, tribenzyl phosphate, and decyl ethyl phenyl phosphate. These phosphates can be used in phosphate to titanium mole ratios of up to 3.0.

Representative but non-exhaustive examples of piperidines useful in the practice of the present invention are 2,2,6,6-tetramethyl piperidine, 3,3,5,5-tetraethyl piperidine, 2,2,6-tri-n-butyl piperidine. 2,6-diphenyl-2,6-dimethyl piperidine, 2,6-dibenzyl-2,6-diethyl piperidine, 2,6-dioctyl piperidine, and 2,6-diphenyl piperidine.

These piperidines can be used in piperidine to titanium mole ratios of up to 3.0.

Representative but non-exhaustive examples of sulfides useful in the practice of the present invention are n-hexyl sulfide n-butyl sulfide, sec-butyl sulfide, n-decyl sulfide, di(2-phenyl propyl)sulfide, phenyl-i-octyl sulfide, benzyl methyl sulfide, phenyl sulfide, and (4-methyl phenyl)sulfide. These sulfides can be used in sulfide to titanium mole ratios of up to 3.0.

Representative but non-exhaustive examples of phosphites useful in the practice of the present invention are tri-n-propyl phosphite, tri-n-butyl phosphite, tri-i-octyl phosphite, di-s-butyl-n-decyl phosphite, dibenzyl-n-hexyl phosphite, diphenyl-i-heptyl phosphite, diethyl phenyl phosphite, benzyl methyl phenyl phosphite, and cyclo-pentyl ethyl octyl phosphite. These phosphites can be used in phosphite to titanium mole ratios of up to 3.0.

Representative but non-exhaustive examples of hydropolysiloxanes useful in the practice of the present invention are polymethylhydrosiloxane (PMHS), polyethylhydrosiloxane, polyethoxyhydrosiloxane, polymethylhydro-dimethylsiloxane copolymer, polymethylhydromethyloctylsiloxane copolymer, polyethoxyhydrosiloxane, tetramethyldisiloxane, diphenyldisiloxane, trimethylcyclotrisiloxane, tetramethylcyclotetrasiloxane, polyphenylhydrosiloxane, polyeicosylhydrosiloxane, polychlorophenylhydrosiloxane, and mixtures of these. The polysiloxanes can be used in polysiloxane to titanium mole ratios of up to 40.0.

Representative but non-exhaustive examples of silicon compounds which are useful in the present invention are trimethylhydroxysilane, triethylhydroxysilane, triphenylhydroxysilane, methyldiphenylhydroxysilane, benzyldiphenylhydroxysilane, diethyldihydroxysilane, dipropyldihydroxysilane, addition siloxanes which are terminated with other groups, such as hydride, amino and carbinol may be used. Also useful are siloxanes which do not contain terminal functional groups.

The polymers may be diluted with a solvent prior to combining them with the hydrocarbon liquid portion of the reduced friction loss compositions. Suitable solvents include kerosene, naphtha and other petroleum distillates and saturated hydrocarbons such as hexane, heptane, octane, etc. While other methods of introduction may be employed the polymers can conveniently be added to the hydrocarbon liquid by continuous injection into the carrier conduit by means of proportionating pumps situated at desired locations along the conduit.

The following examples are presented in illustration of specific embodiments of the invention.

The instant invention is more concretely described with reference to the examples below, wherein all parts and percentages are by weight unless otherwise specified. The examples are provided to illustrated the present invention and not to limit it.

EXPERIMENTAL PROCEDURE

In the experiments which follow, a one-quart, narrow-mouthed beverage-type bottle was washed with soap and water solution and an organic solvent, such as isopropenol, hexane or acetone. The bottle was then rinsed thoroughly with the ionized water, dried for at least 48 hours in an oven at 100° to 140° C., and cooled to room temperature in a vacuum.

The dry bottle was taken into a glove box containing a nitrogen atmosphere, having less than 10 parts per million water and oxygen. Decene-1 (60.5 milliliter) was diluted to a total volume of 500 milliliter with MRTM solvent (trademark of Vista Chemical Co.), and this solution was added quantitatively to the bottle. The liquid olefin and solvent had been nitrogen purged and passed through a bed of molecular sieves and silica gel prior to use. MRTM solvent is an aliphatic hydrocarbon having a molecular weight range similar to that of kerosene.

The bottle was then capped with a rubber septum removed from the glove box and placed in a shaker bath at 0° C. The bottle was equilibrated to the bath temperature. An aliquot of catalyst slurry was then transferred from the septum capped 125 milliliter (ml) bottle to a polymerization bottle using a nitrogen-purged syringe. The polymerization bottle was agitated, as necessary, to keep the catalyst slurry suspended. After 24 hours at 0° C., the polymerization was terminated by mixing 5 ml of a kill solution with a polymerization mixture. The kill solution used was a 4 weight percent solution of Vanlube ® XL in an hexanol. Vanlube ® XL is a registered trademark of and the material was obtained from the R. T. Vanderbilt Co., Inc.

Weight percent polymer was determined gravimetrically by precipitating the polymer from solution with isopropenol. The inherent viscosities were determined according to the Cannon-Ubbelhold 4-bulb viscometer method.

EXAMPLES 1 THROUGH 3

The teachings of U.S. Pat. No. 4,358,572 were experimentally repeated except that dibutylaluminumchloride was utilized instead of diethylaluminum chloride (DEAC). In these experiments, 20 ml of TiCl$_3$AA was combined with 8 ml of 0.5 molar dibutylether (DBE), each providing 4.0 millimoles to the mixture. The mixture was stirred 5 minutes with the reaction bottle capped. After the 5 minute stirring, 15.4 ml of 1.05 molar dibutylaluminum chloride (16.0 millimoles) was added together with 56.6 ml of hexane to form a total volume of 100 ml. Aliquots of this catalysts were added to each of 3 reaction bottles and hexene was added. Polymerizations were carried out for 24 hours at 0° C. at which time reactor contents inherent viscosity were measured. The results are set forth in Examples 1, 2 and 3 of Table 1.

EXAMPLES 4 THROUGH 9

A reaction was carried out as described in Examples 1-3, except that polymethylmethylsiloxane (PMMS) was utilized in place of dibutyl ether. A catalyst was prepared by adding 10 ml of 0.2 molar TiCl$_3$AA containing 1.9955 millimoles titanium with 7.6 ml of 1.05 molar DIBAC (dibutylaluminum chloride) containing 7.982 millimoles of active material. To this mixture was added 2.0 ml of 2.00 molar PMMS containing containing 3.999 millimoles active material. 30.4 ml of hexane was added. The catalyst contained a co-catalyst to titanium ratio of 4 and a PMMS to DIBAC ratio of 0.5. Additional experiments were run, such that Experiment 5 had a PMMS to DIBAC ratio of 1.0. Experiment 6 had a PMMS to DIBAC ratio of 2.0, Experiment 7 had a PMMS to DIBAC ratio of 10.0, Experiment 8 had a PMMS/DIBAC ratio of 0.25, and Experiment 9 was a control having a PMMS ratio to DIBAC of 0 (no PMMS was added). The results are set forth in Table 1 as Experiments 4–9.

EXAMPLES 10 THROUGH 15

Experiments were carried out utilizing various catalyst preparations. In Experiments 10 and 11, the catalyst was formed by combining 10 ml of 0.20 molar TiCl$_3$AA (2.0 millimoles titanium) with 4.0 of 0.5 molar dibutylether (2.0 millimoles). The mixture was stirred 5 minutes with the bottle capped. After the mixture had stirred, 7.7 ml of 1.05 molar dibutylaluminum chloride (7.98 millimoles) was added and the bottle was stirred an additional 5 minutes. After this stirring, 1.0 milliliters of 2.0 molar PMMS (2.0 millimoles PMMS) was added together with 27.3 ml of hexane. The catalyst of a co-catalyst to titanium ratio of 4, a dibutylether to titanium ratio of 1, and a PMMS/titanium of 1.0.

A second catalyst was prepared in the same fashion as described above except that dibutylether and diisobutylaluminum chloride (DIBAC) were added to the TiCl$_3$AA and the entire mixture was stirred for 5 minutes with the bottle capped prior to the addition of PMMS. The catalyst ratios were the same.

A catalyst was prepared in a different fashion such that dibutylether was stirred for 5 minutes with TiCl$_3$AA whereafter dibutylaluminum chloride and PMMS were added to form this catalyst having the same ratio as first described.

Duplicate polymerizations were carried out utilizing the catalysts described, such that Experiments 10 and 11 were formed with catalysts 1; 12 and 13 were formed with catalyst 2; and 14 and 15 were carried out with catalyst 3. The results are set forth in Table 1.

EXAMPLES 16–18

A catalyst was prepared by mixing 100 ml of 0.2 molar TiCl$_3$AA and ml of 0.5 molar dibutylether in an 8 ounce narrow-mouthed bottle with a magnetic stir bar. The solution was stirred under an inert atmosphere for at least 5 minutes prior to using.

From catalyst 1, 14.0 ml of the slurry was combined with 3.8 ml of 1.05 ml molar DIBAC and stirred 5 minutes with the bottle capped. After stirring, 1.0 ml of 2.0 molar PMMS (2.0 millimoles PMMS) was added, together with 31. 2 ml of hexane. The co-catalyst at titanium ratio was 2, the dibutylether to titanium ratio was 1, and the PMMS to titanium ratio was 1 for Example 16.

A second catalyst was prepared exactly as described, except that 7.7 ml of 1.0 molar DIBAC (8.0 millimoles) was added for Example 1.

A third catalyst was prepared, except that 15. 2 ml of 1.05 molar DIBAC was added (16.0 millimoles) for Example 18.

Polymerization were carried out with the catalyst described. The results are set forth in Examples 16–18 of Table 1.

TABLE 1

SUMMARY OF POLYMERIZATION DATA

| Example | Catalyst Preparation | Reactor Content % Polymer | Inherent Viscosity | Olefin/Ti Ratio |
|---|---|---|---|---|
| 1 | 1 TiCl$_3$AA/DBE/DIBAC | 7.51 | 16.5 | 400 |
| 2 | 2 TiCl$_3$AA/DBE/DIBAC | 8.08 | 15.8 | 400 |
| 3 | 3 TiCl$_3$AA/DBE/DIBAC | 8.45 | 15.8 | 400 |
| 4 | TiCl$_3$AA/DIBAC/PMMS | 3.21 | 17.3 | 400 |
| 5 | TiCl$_3$AA/DIBAC/PMMS | 3.03 | 16.8 | 400 |
| 6 | TiCl$_3$AA/DIBAC/PMMS | 3.68 | 16.9 | 400 |
| 7 | TiCl$_3$AA/DIBAC/PMMS | 1.23 | 16.7 | 400 |
| 8 | TiCl$_3$AA/DIBAC/PMMS | 3.82 | 15.9 | 400 |
| 9 | TiCl$_3$AA/DIBAC | 2.90 | 15.5 | 400 |
| 10 | TiCl$_3$AA/DBE/DIBAC/PMMS | 9.10 | 16.3 | 400 |
| 11 | TiCl$_3$AA/DBE/DIBAC/PMMS | 9.88 | 16.2 | 400 |
| 12 | TiCl$_3$AA/DBE/DIBAC/PMMS | 9.23 | 16.3 | 400 |
| 13 | TiCl$_3$AA/DBE/DIBAC/PMMS | 9.30 | 16.1 | 400 |
| 14 | TiCl$_3$AA/DBE/DIBAC/PMMS | 9.06 | 16.7 | 400 |
| 15 | TiCl$_3$AA/DBE/DIBAC/PMMS | 8.88 | 16.7 | 400 |
| 16 | TiCl$_3$AA/DBE/DIBAC/PMMS | 5.27 | 17.0 | 800 |
| 17 | TiCl$_3$AA/DBE/DIBAC/PMMS | 4.93 | 17.2 | 800 |
| 18 | TiCl$_3$AA/DBE/DIBAC/PMMS | 4.44 | 17.2 | 800 |

It can be seen from Table 1 that utilization of the dual electron donor system of the present invention provides an increase in the reaction rate relative to an inherent viscosity (that is, that inherent viscosities of the level previously obtained can be obtained at a higher reactor polymer content). It can also be seen from Examples 16–18 that when amount of polymer is sacrificed by lowering the proportion of catalyst activity components, that even higher inherent viscosities can be routinely obtained. The present invention thus provides a specific catalyst for increasing that inherent viscosity of produced polymer, or in the alternative, providing a much higher rate of obtaining polymer at lower inherent viscosities.

While certain embodiments and details have been shown for the purpose of illustrating the present invention, it will be apparent to those skilled in this art that various changes and modifications may be made herein without departing from the spirit or scope of the invention.

We claim:

1. A catalyst capable of forming ultrahigh molecular weight polymers, as characterized by an inherent viscosity greater than 12.0, comprising:
   (1) a transition metal halide of the general formula MX$_t$ wherein M is titanium or vanadium, and t is equal to 2.5 to 4.0, and X is a halogen;
   (2) at least one first electron donor selected from the group consisting of ethers, esters, amines, phosphines, piperdines, phosphites, phosphates, pyridenes, sulfides and mixtures of these;
   (3) a co-catalyst comprising an organoaluminum or organoaluminum halide of the formula AlR$_n$X$_{3-n}$, wherein R is a hydrocarbon radical containing from 1 to 20 carbon atoms, X is at least one constituent selected from the group consisting of halogen, siloxide or alkoxide, and n is less than 3.0; and (4) a polysiloxane second electron donor having the general formula

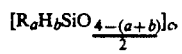

wherein R is hydrogen an alkyl group containing from 1 to 20 carbon atoms, an aralkyl or alkaryl group containing from 6 to 20 carbon atoms, a and b are greater than 0, where the sum of a+b does not exceed 3, and c is 2 or more.

2. A catalyst as described in claim 1 wherein the polysiloxane is a hydropolysiloxane, where a has a value of from 0.1 to 2.0, b has a value of 1.0, 2.0 or 3.0, and wherein the sum of (a+b) does not exceed 3.

3. A catalyst as described in claim 2 wherein the first electron donor compound is primarily an ether compound containing alkyl, aryl, aryl alkyl, aryl alkyl, or alkyl aryl groups, each containing from 1 to 30 carbon atoms or cycloalkyl ethers containing from 6 to 30 carbon atoms.

4. A catalyst as described in claim 3 wherein the ether is at least one ether selected from the group consisting of diethyl ether, benzyl ether, tert-butyl methyl ether, di-n-butyl ether, diisopropyl ether, di-n-propyl ether, cyclododecene oxide, cyclohexene oxide, cyclooctene oxide, cyclopentene oxide, dibenzylfuran, dihydropyran, furan, 2-methylfuran, 3-methylfuran, 2-methyltetrahydrofuran, 3-methyltetrahydrofuran, styrene oxide, tetrahydrofuran, m-phenoxytoluene, phenyl ether, anisole, butyl phenyl ether, m-dimethoxybenzene, p-dimethoxybenzene, 2,6-dimethoxytoluene, 1-methoxynaphthalene, and 2-methoxynaphthalene.

5. A catalyst as described in claim 3 wherein the first electron donor is an amine selected from the group consisting of: tri-n-butyl amine, diisopropyl ethyl amine, dibutyl amine, trimethyl amine, tri-n-propyl amine, tri-i-propyl amine, tribenzyl amine, tri(4-methyl phenyl) amine, triphenyl amine, dimethyl phenyl amine, di-sec-butyl benzyl amine, ethyl propyl phenyl amine, diisopropyl ethyl amine, diisopropyl amine, di-n-butyl amine, dibenzyl amine, diphenyl amine, benzyl methyl amine, benzyl phenyl amine, and n-butyl-i-propyl amine.

6. A method for preparing a catalyst capable of forming ultra-high molecular weight polymers as characterized by an inherent viscosity greater than 12.0, comprising combining under an inert substantially anhydrous atmosphere:

(1) a transition metal halide of the general formula $MX_t$ wherein M is titanium or vanadium, and t is equal to 2.5 to 4.0, and X is a halogen, with (2) at least one first electron donor selected from the group consisting of ethers, esters, amines, phosphines, piperidines, phosphites, phosphates, pyridines, sulfides and mixtures of these, and allowing the components to react for a period of at least 3 minutes, then contacting the reaction production of (1) and (2) with (3) a co-catalyst comprising an organoaluminum or organoaluminum halide of the formula $AlR_nX_{3-n}$, wherein R is a hydrocarbon radical containing from 1 to 20 carbon atoms, X is at least one constituent selected from the group consisting of halogen, siloxide, or alkoxide and n is less than 3.0, then combining (4) a polysiloxane second electron donor having the general formula

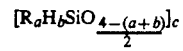

wherein R is hydrogen, an alkyl group containing from 1 to 20 carbon atoms, an aralkyl or alkaryl group containing from 6 to 20 carbon atoms, a and b are greater than 0, and where the sum of (a+b) does not exceed 3, and c is 2 or more.

7. A method as described in claim 6 wherein transition metal halide and first electron donor are allowed to react for at least 5 minutes prior to adding the additional catalyst components.

8. A method as described in claim 7 wherein the first electron donor is selected from the group consisting of ethers and amines.

9. A method as described in claim 6 wherein the ether is at least one ether selected from the group consisting of: benzyl ether, tert-butyl methyl ether, di-n-butyl ether, diisopropyl ether, di-n-propyl ether, cyclododecene oxide, cyclohexene oxide, cyclooctene oxide, cyclopentene oxide, dibenzylfuran, dihydropyran, furan, 2-methylfuran, 3-methylfuran, 2-methyltetrahydrofuran, 3-methyltetrahydrofuran, styrene oxide, tetrahydrofuran, m-phenoxytoluene, phenyl ether, anisole, butyl phenyl ether, m-dimethoxybenzene, p-dimethoxybenzene, 2,6-dimethoxytoluene, 1-methoxynaphthalene, and 2-methoxynaphthalene.

10. A method as described in claim 6 wherein the amines are selected from the group consisting of tri-n-butyl amine, diisopropyl ethyl amine, dibutyl amine, trimethyl amine, tri-n-propyl amine, tri-i-propyl aming, tribenzyl amine, tri(4-methyl phenyl) amine, triphenyl amine, dimethyl phenyl amine, di-sec-butyl benzyl amine, ethyl propyl phenyl amine, diisopropyl ethyl amine, diisopropyl amine, di-n-butyl amine, dibenzyl amine, diphenyl amine, benzyl methyl amine, benzyl phenyl amine, and n-butyl-i-propyl amine.

* * * * *